(12) United States Patent
Chuang

(10) Patent No.: US 7,076,319 B2
(45) Date of Patent: Jul. 11, 2006

(54) METHOD AND DATABASE STRUCTURE FOR MANAGING TECHNOLOGY FILES FOR SEMICONDUCTOR MANUFACTURING OPERATIONS

(75) Inventor: Hsien-Pi Chuang, Hsin chu (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 377 days.

(21) Appl. No.: 10/733,899

(22) Filed: Dec. 11, 2003

(65) Prior Publication Data

US 2005/0131956 A1    Jun. 16, 2005

(51) Int. Cl.
*G06F 19/00* (2006.01)
(52) U.S. Cl. .................. 700/121; 700/95; 700/117
(58) Field of Classification Search .............. 700/95, 700/97, 117, 121; 707/200
See application file for complete search history.

(56) References Cited

U.S. PATENT DOCUMENTS

| | | | | |
|---|---|---|---|---|
| 5,586,039 A | * | 12/1996 | Hirsch et al. | 700/95 |
| 5,757,673 A | * | 5/1998 | Osheiski et al. | 702/182 |
| 6,865,509 B1 | * | 3/2005 | Hsiung et al. | 702/182 |
| 6,917,849 B1 | * | 7/2005 | Pasadyn et al. | 700/121 |

* cited by examiner

*Primary Examiner*—Jayprakash N. Gandhi
(74) *Attorney, Agent, or Firm*—Duane Morris LLP

(57) ABSTRACT

A method and database structure are disclosed for generating a set of technology files for fabricating semiconductor devices using a first technology using a repository of technology files. The technology files help to implement fabrication processes. First, a first set of virtual technology files are created pertaining to the first technology, then a second set of virtual technology files pertaining to a second technology are identified. The second set of virtual technology files are linked to a predetermined set of actual files in the repository. If it is determined that the first and the second technologies are similar to each other, one or more links of the second set of virtual technology files are copied to generate corresponding links for a first subset of virtual technology files of the first set if the first and second technologies allow the corresponding actual files to be shared.

18 Claims, 4 Drawing Sheets

METHOD AND DATABASE STRUCTURE FOR MANAGING TECHNOLOGY FILES FOR SEMICONDUCTOR MANUFACTURING OPERATIONS

BACKGROUND

The present disclosure relates generally to content management of information, and more particularly, to documentation and maintenance of a repository system of technology data files for different technology generations in a semiconductor fabrication environment.

In a fast growth rate high technology manufacturing environment, it is vital to track and maintain detailed fabrication specifications and information for each generation of product technology. Each generation of product technology must be thoroughly documented such that all production fabrication specifics and details are compiled into a detailed set of physical or actual technology files from which all fabrication flows for the manufacturing operation are derived.

A typical manufacturing facility will have in production, many different devices and generations of fabrication technologies within the same operational facilities and organizational structure. These facilities must maintain a repository and maintenance system (or systems) for the documentation of multiple actual technology file sets, known as Process Release Standards (PRS). Each PRS will be separated into integration and module categories. For a module PRS(MPRS) set may be further segmented into lower levels of file sets for more detailed categorization into more manageable groups. Such categorization groups typically represent fabrication process similarity, tool similarity, recipe similarity. Portions or segments of the specified information in the detailed MPRS sets may or may not be common within or to other MPRS sets. This often leads to high levels of system complexity for informational maintenance and traceability of the physical document files.

What is needed is an efficient, less complex method for maintaining the required information for all fabrication technologies within the fabrication environment.

SUMMARY

A method and system is provided for a linked virtual component pool based file and content storage repository for the documentation of manufacturing fabrication details of multiple technology generations.

A method is described according to one example of the present disclosure for generating a set of technology files pertaining to fabricating semiconductor devices using a first technology. After creating a first set of virtual technology files pertaining to a first technology, a second set of virtual technology files pertaining to a second technology are identified, the second set of virtual technology files being linked to a predetermined set of actual files in a document repository, and the first and the second technologies being similar to each other. One or more links of the second set of virtual technology files are copied to generate corresponding links for a first subset of virtual technology files of the first set if the first and second technologies allow the corresponding actual files to be shared. The first set of the virtual technology files are then approved to make it effective for implementing the first technology.

These and other aspects and advantages will become apparent from the following detailed description, taken in conjunction with the accompanying drawings, illustrating by way of example the principles of the disclosure.

DESCRIPTION

The present disclosure describes a methodology for the repository and storage of technology data file sets (PRSs) used for the specification of the fabrication requirements for semiconductors devices. The use of an established database of specific virtual links connecting defined virtual files to actual, physical technology files of a shared document pool is featured. Such an efficient method and system as disclosed below reduces the manpower and time consuming work required for the definition of new technology files sets and the upkeep and administration of the complex fabrication information. Errors and work rework/duplication will also be lessened with such an efficient system. Subsequent new technology creations, transfers, maintenance of fabrication process flows and the associated administrative tasks will occur within shortened time periods and quicker cycles.

Figure 1:
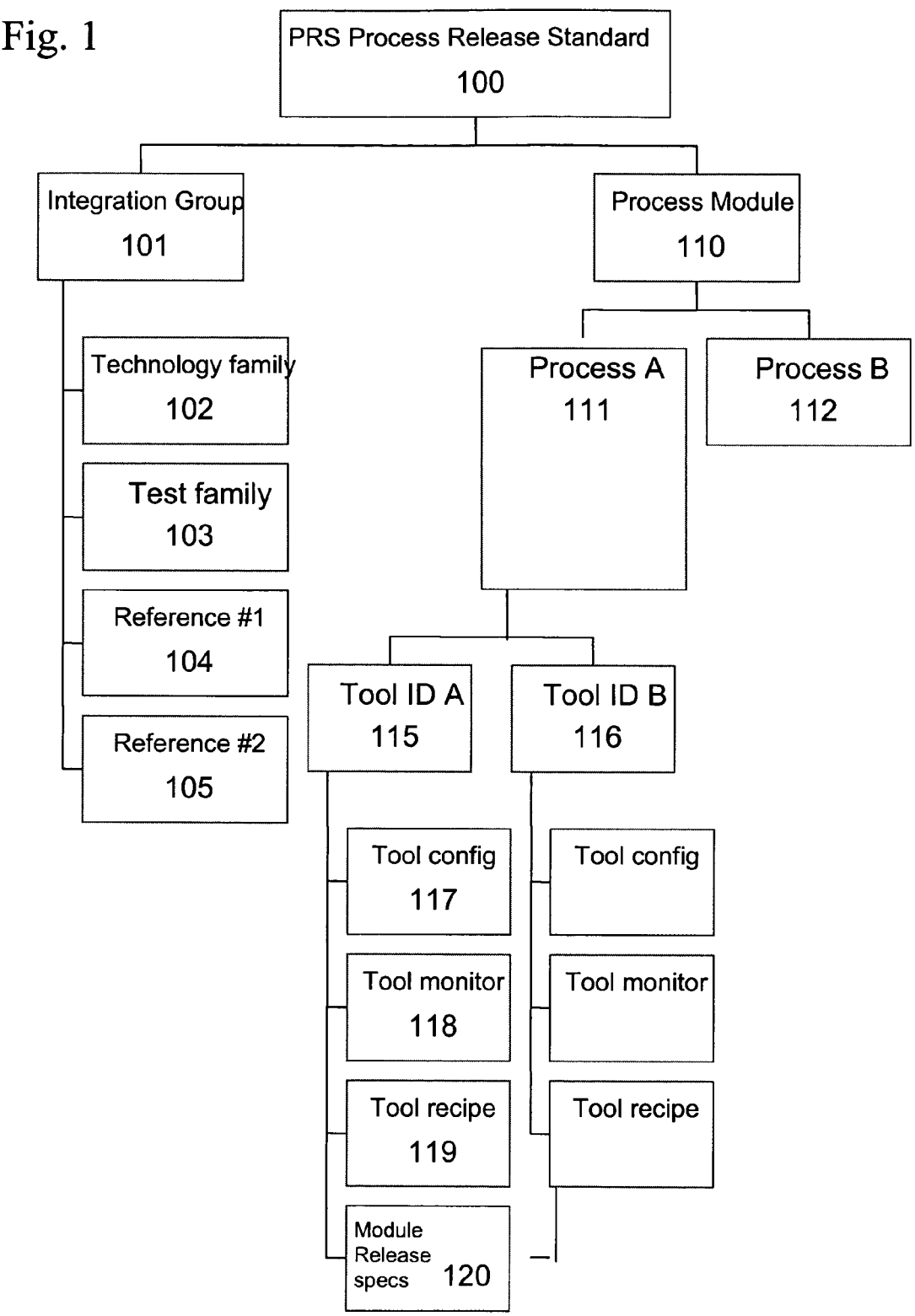
FIG. 1 illustrates a hierarchal structure of fabrication information management according to one example of the present disclosure.

Referring now to FIG. 1, a hierarchal structure of fabrication information management according to one example of this disclosure is shown. In this example, a collection of technology files defining a technology file set, Process Release Standard (PRS) 100, has been created for a fabrication technology. Fabrication details for the technology are subsequently branched out into separate categories. It is understood that the number of splits and hierarchal branches may differ in quantity based upon required levels of detailing in practice, all with the characteristics of the lower branches narrowing down of informational content into more specific and detailed levels.

In this example, FIG. 1 shows the second level categories to be split into 2 groups, Integration 101 and Process Module 110. The Integration group 101 is subsequently split into a third level of groups: Technology Type 102, Test Family 103, Reference #1 (104) and Reference #2 (105). The second level Process Module 110 group is also split further into a third level, comprising of different Process Types such as Process A 111 and Process B 112. It is within this branch of files, which holds all of the information required to detail the specifics for each process fabrication operation. Each Process branch is subsequently split into the fourth level, Tool IDs 115 and 116. Finally, the last and most specific level of details is split into tool-specific production information such as Tool Configuration 117, Tool Monitor 118, Tool Recipe 119, and Module Release Specs(MRS) 120. It is held within these last categories, the names of virtual files that are virtually hyperlinked to actual files held within a shared document pool repository.

Figure 2:
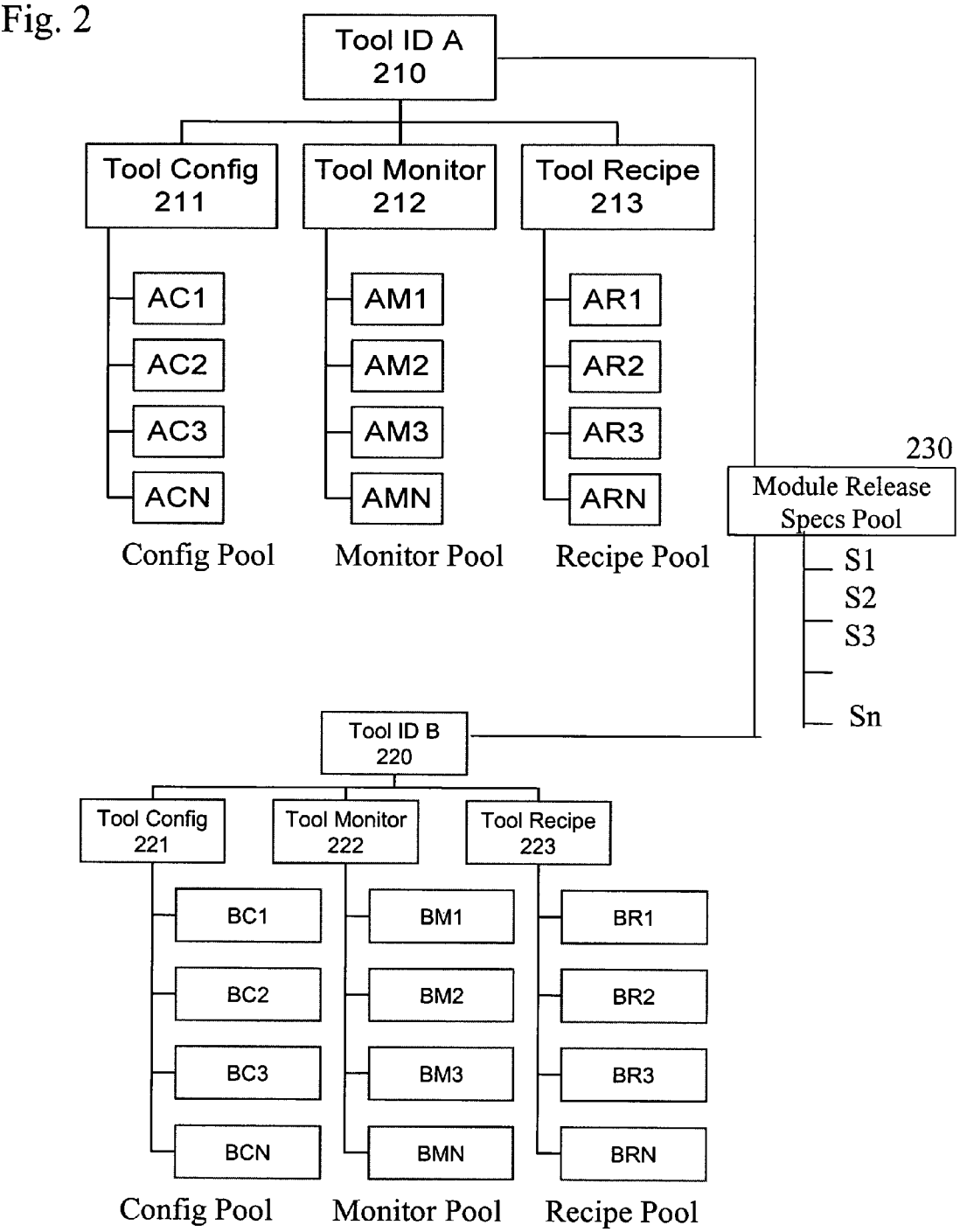
FIG. 2 illustrates in more detail selected branches of the structure shown in FIG. 1.

Referring now to FIG. 2, the last two levels of the hierarchal structure as shown in FIG. 1 is shown in detail. Tool ID levels (e.g., Tool ID A 210 and Tool ID B 220) are shown with their subcategories for Tool Configurations 211 and 221, Tool Monitors 212 and 222, Tool Recipes 213 and 223 and the non-tool based shared group, Module Release Specs information files. Note that for the Tool Configuration, Tool Monitor and Tool Recipe group of files, each pool of actual sub-files is uniquely defined for use within their respective Tool ID. Thus, each Tool Configuration pool, Tool Monitor pool and Tool Recipe pool are assigned to a specific Tool ID group. Tool Configuration pool 211, Tool Monitor pool 212 and Tool Recipe pool 213 are uniquely assigned to Tool ID A 210, just as Tool Configuration pool 221, Tool Monitor pool 222 and Tool Recipe pool 223 are uniquely assigned to Tool ID B 220. The Module Release Spec pool 230 also comprises of actual files and documents that may also be shared via virtual files and virtual links to help define the different technology PRS file sets. The usage of the Module Release Spec 230 group provides for additional flexibility by allowing the definition of any non-tool specific fabrication information for the technology file set.

Figure 3:
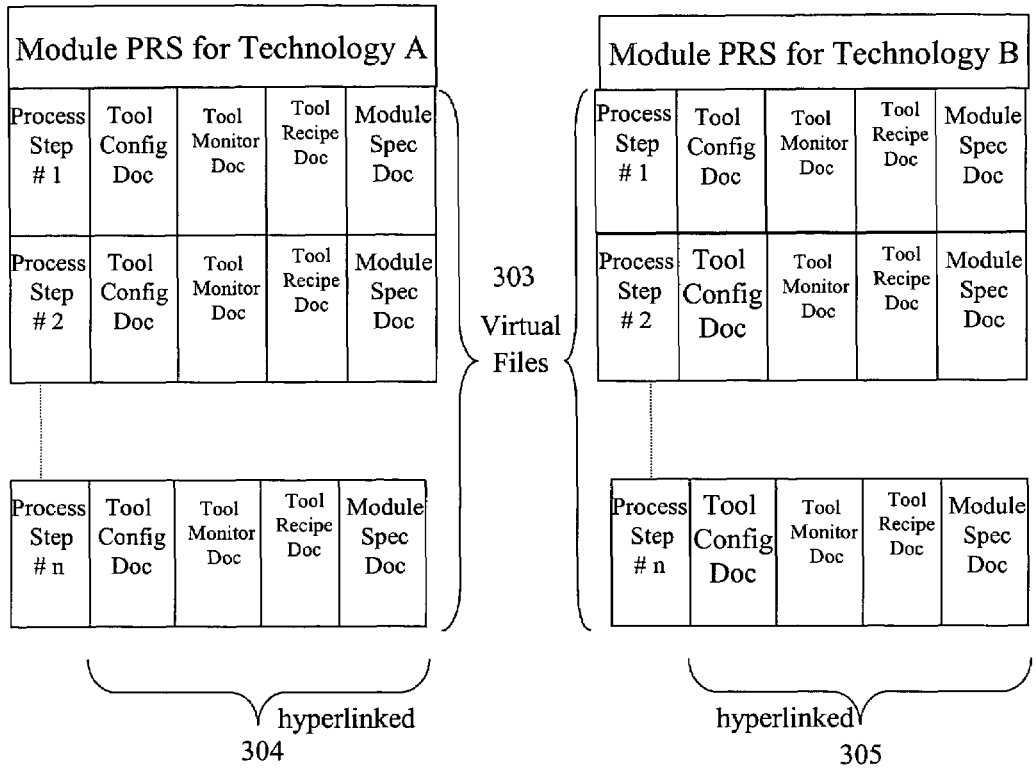
FIG. 3 illustrates a hierarchal structure showing specific data file groups for two different fabrication technologies that are linked in a virtual environment.
Figure 3:
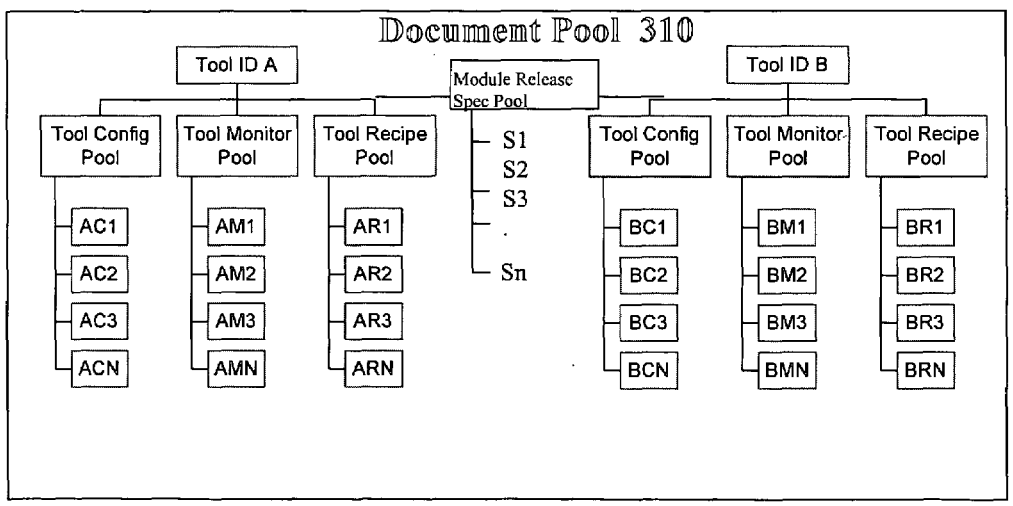

Referring now to FIG. 3, the hierarchal structures of two Module Process Release Standards (MPRSs) 301 and 302 are shown. An MPRS is a summary of the fabrication flow details for a given technology generation within the fabrication facility in a format that is a sequential, process step-by-step compilation of all required technology files and fabrication documents. Each MPRS may be unique for a given PRS technology set. Each process step of each MPRS contains unique virtual files 303 for each level of the PRSs' Tool ID category branch: Tool Config, Tool Monitor, Tool Recipe and Module Release Spec. The virtual files 303 themselves may not have actual content, but are used as connection points within the MPRS for pointing via hyperlinks 304 and 305 to actual files held within the physical document repository 310. Virtual links 304 and 305 between the virtual files 303 and actual files 310 are established and created during the definition of technology file sets. Each virtual file 303 is unique for a given technology file set. Virtual links 304 and 305 connecting to actual files of the document repository 310 may be copied and used multiple times within an MPRS 301 and/or 302, as well as for multiple technology sets if the specification contents of the actual files are applicable to the linked virtual files 303.

If the specification content for any specific MPRS process step item is unique and no actual file exists within the document pool repository 310, a new physical file is created within the document pool and a new virtual file 303 is defined and established within the technology set's MPRS. A new virtual link 304 or 305 is also defined and created to connect the virtual file 303 to the new actual file within the document pool 310. The newly established virtual link 304 or 305 becomes available for future use and linkage during the creation of future product fabrication technology file sets.

During the definition of new technology file sets PRS, previously defined virtual links 304, 305 to actual files of the document repository 310 may be copied and used if the actual files' detailed file specifications and data are applicable for the new technology's MPRS. New virtual files 303 are created for the new technology's MPRS using the existing virtual links 304 or 305. The virtual hyperlinking of these virtual files to actual files allows for the simplification of the fabrication information management in the fabrication facility. This hyperlinking methodology allows for a faster modular, building-block construction process for the definition of all existing and new fabrication flows for all technology generations of the fabrication facilities. The hyperlinked MPRSs improve the data editing process and the administration approval process and traceability of file updates. Duplicate work, work rework and probability for errors are greatly reduced. Data storage requirements are not as voluminous as conventional administrative methods. Data queries and administrative reviews are more easily accomplished.

Tables I and II below represent examples of Module Process Release Standard(MPRSs) for two different fabrication Technologies: Technology A and B.

TABLE I

| | | Technology A | | |
|---|---|---|---|---|
| Process Step # | Tool ID | Tool Monitor | Tool Recipe | Module Release Spec |
| 1 | A | AM6 | AR2 | S1 |
| 2 | B | BM6 | BR1 | S3 |
| 3 | C | CM1 | CR5 | S7 |
| 4 | Z | ZM2 | ZR3 | S1 |

TABLE II

| | | Technology B | | |
|---|---|---|---|---|
| Process Step # | Tool ID | Tool Monitor | Tool Recipe | Module Release Spec |
| 1 | A | AM3 | AR2 | S9 |
| 2 | D | DM6 | DR6 | S10 |
| 3 | X | XM1 | XR2 | S3 |
| 4 | B | BM1 | BR7 | S2 |

The two tables illustrate how actual technology data files may be virtually linked, shared and related to each other to create the fabrication process flows for two different production technologies through the virtual technology file management. Note that within each cell of the tables, the unique virtual files names are not shown, but rather, the names of the linked actual repository files are shown to better illustrate the final link associations for the methodology of the present disclosure.

The Tool Config, Tool Monitor, and Tool Recipe columns of Tables I and II specify all tool related information for the particular technology. The Module Release Spec column is used to specify any non tool based level of fabrication details for each Process Step. Each identified technology document specified in the cells of each table's Process Step row # represents a virtual file with an established virtual link to an actual file held within the document pool of the system. It is by this matrix of virtually linked data files to the document pool, by which the entire fabrication flow for each technology is defined and detailed for each Process Step, row by row. The virtual links are defined and used as building blocks to create and identify many different fabrication flows. As shown in the above tables, virtual linked Tool Recipe AR2, a unique recipe originating from and used for Process Step #1 for Technology A in Tool ID A, is also virtually linked and used as the Tool Recipe for Process Step #1 of Technology B in Tool ID A. However, a different virtual linked Module Release Spec parameter, S1, is used for Technology A while Technology B specifies a virtual link to Module Release Spec parameter S9. Similarly, the same example shows the Module Release Spec parameter S3 is linked and used for both Technology A's Process Step #2 in Tool ID B, Recipe #BR1 and linked and used for Technology B's Process Step #3 in Tool ID X, Recipe #XR2.

Where applicable, certain virtual links may be copied and used in several or many locations of different Process Steps of one or several technology MPRSs. These tables illustrate the building-block nature of the content file management methodology and how certain actual data files and specifications may be virtually linked and used in many locations for various technologies.

Figure 4:
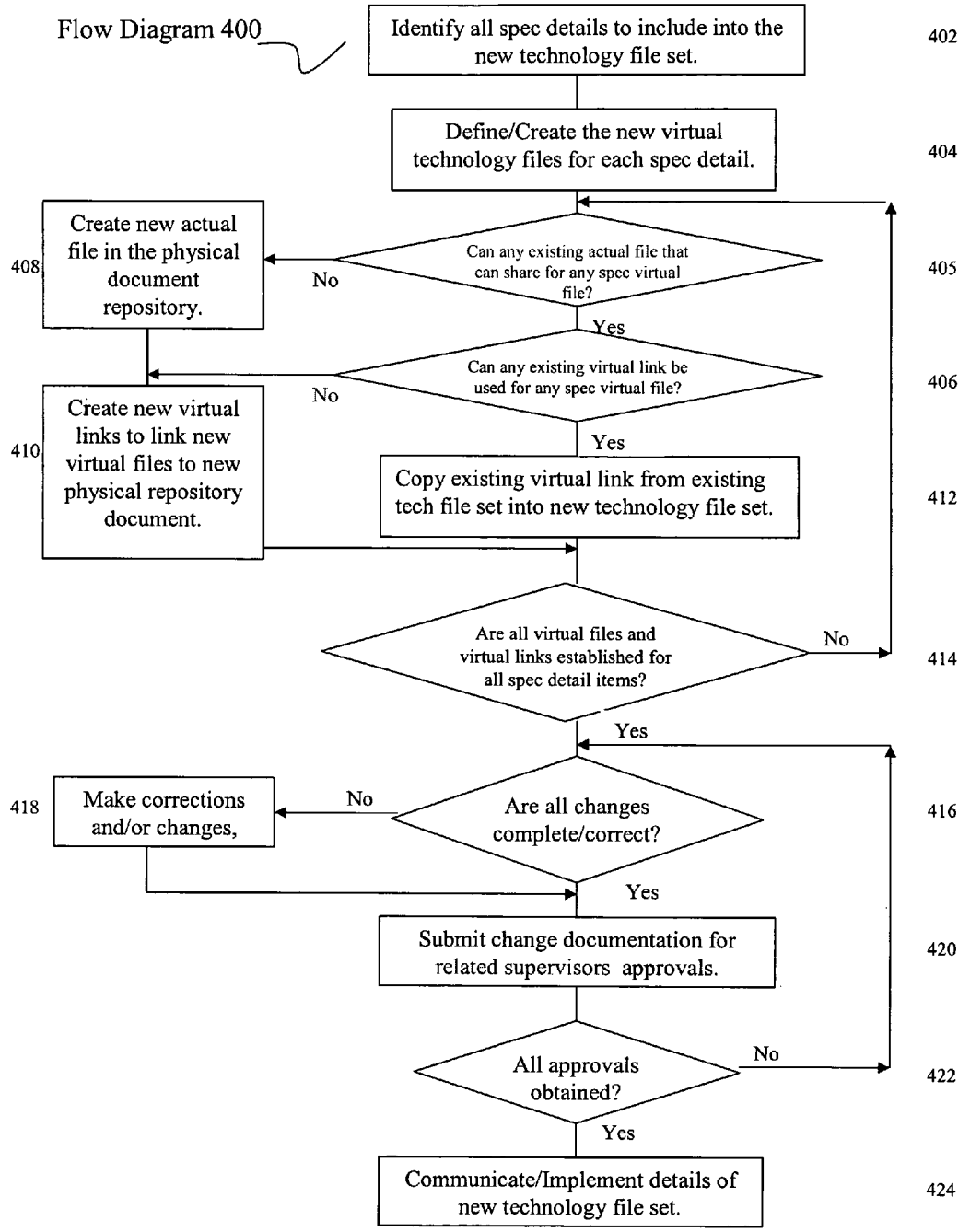
FIG. 4 is a flow chart illustrating process steps for the creation of, or the management of spec details within a new technology file set.

FIG. 4 is a flow diagram 400 illustrating the steps for the creation of, and the management of spec fabrication details for a new virtual technology file set in accordance to the present disclosure. The first step 402 is to identify all spec items and details to be included into the new technology file set. The next step 404 is to define and create the new, unique virtual technology files assigned to the technology file set for each spec detail item. The professionals who create these virtual titles may be referred to as the owners of the created virtual files. A check step 405 is then performed to identify any existing actual files previously created and that can be shared within any existing technology file. A check step 406 is then performed to identify any existing virtual links previously created and used within any existing technology file. Any identified, usable virtual link may be copied and used within the new technology file if the contents of the linked physical files are applicable for the new fabrication technology. Similar to the virtual files, each physical file also has its owners. If there are no previous virtual links available for the spec item of the new technology, the new actual file is created in the physical document repository in step 408 and a new virtual link is created in step 410 if connecting the new virtual and new actual technology files are required. Virtual links between the new virtual and actual technology files are made so that the new links may be copied (step 412) and used during the definition and creation of future technology file sets.

Flow step 414 requires the repeat of virtual link assignments or the definition/creation procedures until all required spec detail items have been addressed. Upon completion of all spec items, review and check (steps 416 and 418) may be performed to ensure work integrity and completeness. It is understood that other than the owners of the physical and virtual files, authorized users may sometimes be given the right to edit files. The changes are documented representing all data editing work made, and may then be submitted for administrative notification, review and approval in steps 420 and 422. For example, if a file change has to be made in an actual file, but the file is linked by various virtual files, the change has to be approved not only by the owner of the actual file, but also by various owners of the relevant virtual files. This notification, review and approval process may be initiated and carried through as separate virtual documents within the virtual environment. After approval, the new technology file set may then be communicated and implemented into the fabrication facilities by step 424.

The virtual link system of virtual files of a technology file set to actual files of a physical document pool is the key feature of the file content management methodology disclosed. The methodology allows for the conservation of much work and time from having to create numerous, duplicate files and physical documents. The method and database structure allows for the copy and use of previously established virtual links to accomplish faster and less complex tasks during set up of fabrication spec details for new technology file sets. The linked database allows for the simultaneous generation and update of multiple technology file sets. The virtual environment of the links and document repository allows for the change work and administrative review/approval processes to be accomplished with minimal amount of physical paper documentation.

It will also be understood by those having skill in the art that one or more (including all) of the elements/features of the present disclosure may be implemented using software executed on a general purpose computer system or networked computer systems, using special purpose hardware-based computer systems, or using combinations of special purpose hardware and software.

The present invention as described above thus provides an improved method for providing content management of virtual technology files in a semiconductor fabrication environment. Various benefits are achieved over conventional approaches. These benefits include, less complexity for system maintenance, data file update and traceability, lessened error incidents and work reworks, along with improved opportunities for subsequent fabrication technology transfer, implementation and development cycle times.

The above disclosure provides several different embodiments, or examples, for implementing different features of the invention. Specific examples of components, and processes are described to help clarify the invention. These are, of course, merely examples and are not intended to limit the invention from that described in the claims.

While the invention has been particularly shown and described with reference to the preferred embodiment thereof, it will be understood by those skilled in the art that various changes in form and detail may be made therein without departing from the spirit and scope of the invention, as set forth in the following claims.

What is claimed is:

1. A method computer-implemented for generating a set of technology files pertaining to fabricating semiconductor devices using a first technology, comprising:
   creating a first set of virtual technology files pertaining to a first technology;
   identifying a second set of virtual technology files pertaining to a second technology, the second set of virtual technology files being linked to a predetermined set of actual files in a document repository;
   copying one or more links of the second set of virtual technology files to generate corresponding links for a first subset of virtual technology files of the first set if the first and second technologies allow the corresponding actual files to be shared; and
   approving the first set of the virtual technology files to make it effective for implementing the first technology.

2. The method of claim 1 further comprising establishing one or more links between a second subset of the first set of virtual technology files with one or more actual files not linked to the second set of virtual technology files in the document repository.

3. The method of claim 2 further comprising:
   creating one or more actual files for the first technology in the document repository if needed; and
   linking the created actual files to a third subset of virtual technology files of the first set.

4. The method of claim 2 wherein the establishing further includes querying each technology file to determine whether the technology file is linkable.

5. The method of claim 1 further comprising modifying one or more actual files in the document repository to update all virtual technology files for different technologies linked thereto.

6. The method of claim 5 wherein the modifying further includes:

notifying one or more virtual document owners who use one or more virtual technology files linked to each modified actual file about proposed modifications;

confirming the modifications based on approvals obtained from the administrators and those virtual document owners; and modifying the actual files to update all the virtual technology files linked thereto.

7. The method of claim 1 further comprising establishing the document repository of technology files for practicing fabrication processes by multiple virtual document owners.

8. A component based semiconductor fabrication process information management system comprising:

a data input process unit for importing one or more physical technology files containing the semiconductor fabrication process information into the system;

a data editing process unit for editing the physical technology file or changing one or more links associated thereto by one or more authorized virtual document owners; and a data linking process unit for linking one or more physical technology files with one or more virtual technology files to generate a set of technology files for a predetermined fabrication process.

9. The system of claim 8 wherein the set of technology files for the predetermined fabrication process includes information regarding tool configuration, tool recipe, tool monitor based on tool name and module release specification.

10. The system of claim 8 wherein the data input process unit further includes means for at least one physical file owner to enter information regarding wafer size, module, and tool name.

11. The system of claim 8 wherein the data editing process unit further includes means for allowing at least one authorized user to edit a file at any time.

12. The system of claim 8 further comprising a modification approval process unit for obtaining predetermined approvals after any file has been edited.

13. A computer-implemented method for creating a set of technology files for fabricating semiconductor devices, comprising:

identifying a first technology generation to be implemented for fabricating semiconductor devices;

creating a first set of virtual technology files embodying the first technology generation, the virtual technology files requiring information regarding tool configuration, tool recipe, tool monitor, and module release specification;

identifying a first subset of the first set of virtual technology files that are identical to a second set of virtual technology files embodying a second technology, the second set of virtual technology files being linked to a predetermined set of actual files in a document repository; and copying one or more links of the second set of virtual technology files for linking the first subset of virtual technology files to corresponding actual files.

14. The method of claim 13 further comprising establishing one or more links to one or more actual technology files in the document repository for a second subset of the first set of virtual technology files if the actual technology files are available in the document repository and do not related to the second set of virtual technology files.

15. The method of claim 14 further comprising:

creating one or more actual files needed for the first technology generation in the document repository if such actual files do not exist; and linking the created actual files to a second subset of virtual technology files of the first set.

16. The method of claim 15 further comprising approving the first set of the virtual technology files to make it effective for implementing the first technology generation.

17. The method of claim 13 further comprising modifying one or more actual files in the document repository.

18. The method of claim 17 further includes:

sending proposed modifications to one or more virtual document owners who use one or more virtual technology files linked to the actual files to be modified;

confirming the modifications based on approvals obtained from the virtual document owners; and modifying the actual files to update all the virtual technology files linked thereto.

* * * * *

UNITED STATES PATENT AND TRADEMARK OFFICE
CERTIFICATE OF CORRECTION

PATENT NO.        : 7,076,319 B2
APPLICATION NO.   : 10/733899
DATED             : July 11, 2006
INVENTOR(S)       : Hsien-Pi Chuang It is certified that error appears in the above-identified patent and that said Letters Patent is hereby corrected as shown below:

Column 6, line 32, move "computer-implemented" after "method" and insert it between "A" and "method".

Signed and Sealed this

Twenty-fourth Day of July, 2007

JON W. DUDAS
*Director of the United States Patent and Trademark Office*